United States Patent
Ozaki et al.

(10) Patent No.: US 8,343,659 B2
(45) Date of Patent: Jan. 1, 2013

(54) HYDROGEN ABSORBING ALLOY, PRODUCTION METHOD THEREOF, AND SECONDARY BATTERY

(75) Inventors: Tetsuya Ozaki, Kyoto (JP); Tetsuo Sakai, Osaka (JP); Manabu Kanemoto, Kyoto (JP); Tadashi Kakeya, Kyoto (JP); Minoru Kuzuhara, Kyoto (JP); Masaharu Watada, Kyoto (JP)

(73) Assignees: GS Yuasa International Ltd., Kyoto (JP); National Insitute of Advanced Industrial Science and Technology, Tokyo (JP)

( * ) Notice: Subject to any disclaimer, the term of this patent is extended or adjusted under 35 U.S.C. 154(b) by 1258 days.

(21) Appl. No.: 12/064,420

(22) PCT Filed: Aug. 24, 2006

(86) PCT No.: PCT/JP2006/316615
§ 371 (c)(1),
(2), (4) Date: Feb. 21, 2008

(87) PCT Pub. No.: WO2007/023901
PCT Pub. Date: Mar. 1, 2007

(65) Prior Publication Data
US 2009/0148770 A1 Jun. 11, 2009

(30) Foreign Application Priority Data
Aug. 26, 2005 (JP) .................................. 2005-246107

(51) Int. Cl.
*H01M 4/52* (2010.01)

(52) U.S. Cl. .................. 429/218.2; 429/218.1; 429/226
(58) Field of Classification Search ............... 429/218.2, 429/218.1, 226
See application file for complete search history.

(56) References Cited

U.S. PATENT DOCUMENTS

2003/0096164 A1 * 5/2003 Sakai et al. .................. 429/206

FOREIGN PATENT DOCUMENTS

| JP | 10-321223 | 12/1998 |
|---|---|---|
| JP | 11-323469 | 11/1999 |
| JP | 3015885 | 3/2000 |
| JP | 2001-226722 | 8/2001 |
| JP | 2001-307720 | 11/2001 |
| JP | 2001-307721 | 11/2001 |
| JP | 2001-316744 | 11/2001 |
| JP | 3247933 | 1/2002 |
| JP | 2002-83593 | 3/2002 |
| JP | 2002-105563 | 4/2002 |

(Continued)

OTHER PUBLICATIONS

International Search Report for PCT/JP2006/316615, mailed Oct. 3, 2006, Japanese Patent Office, 2 pages.

(Continued)

*Primary Examiner* — Jane Rhee
(74) *Attorney, Agent, or Firm* — Sterne, Kessler, Goldstein & Fox P.L.L.C.

(57) ABSTRACT

The present invention provides a hydrogen absorbing alloy containing a phase of a $Gd_2Co_7$ type crystal structure, wherein the phase exists at a ratio of 10 weight % or higher in the entire hydrogen absorbing alloy and yttrium is contained at a ratio of 2 mol % or more and 10 mol % or less in the entire hydrogen absorbing alloy.

8 Claims, 2 Drawing Sheets

○ R (Rare earth element)
◉ R/Mg
● M (Transition metal, Al)

FOREIGN PATENT DOCUMENTS

| | | |
|---|---|---|
| JP | 2002-105564 | 4/2002 |
| JP | 2004-221057 | 8/2004 |

OTHER PUBLICATIONS

Kanemoto et al., "Development of High-Capacity Metal Hydride Electrodes Using Various Rare Earth-Mg-Ni Based Super-Lattice Alloys," Meeting Abstracts—MA 2005-02, 208th Meeting of the Electrochemical Society, Oct. 16-21, 2005, The Electrochemical Society, 3 pgs.

International Preliminary Report on Patentability from the International Bureau of WIPO, issued Feb. 26, 2008, 4 pages.

* cited by examiner

Fig. 1

○ R (Rare earth element)

● R/Mg

● M (Transition metal, Al)

Fig. 2

HYDROGEN ABSORBING ALLOY, PRODUCTION METHOD THEREOF, AND SECONDARY BATTERY

TECHNICAL FIELD

The present invention relates to a hydrogen absorbing alloy, a secondary battery using the alloy, and a method for producing the hydrogen absorbing alloy.

BACKGROUND ART

As a hydrogen absorbing alloy to be used for a secondary battery, "rare earth-Ni-based hydrogen absorbing alloys" containing a $CaCu_5$ type crystal as a main phase and "Laves phase-based hydrogen absorbing alloys" containing Ti, Zr, V, and Ni have been known. As a new hydrogen absorbing alloy replacing these hydrogen absorbing alloys, in recent years, "rare earth-Mg—Ni-based alloys" have been drawing attention. It is because that this hydrogen absorbing alloy is reported to have a discharge capacity exceeding that of an $AB_5$ type alloy.

Patent Document 1 discloses an electrode using an $LaCaMgNi_9$ alloy having a $PuNi_3$ type crystal structure.

Patent Documents 2 to 4 disclose that electrodes using rare earth-Mg—Ni-based alloys having a $Ce_2Ni_7$ type crystal structure or the like show good hydrogen releasing characteristics while keeping a high hydrogen storage capacity.

For instance, in paragraph numbers 0252 to 0254 of Patent Document 2, a fifteenth hydrogen absorbing alloy is disclosed and the fifteenth hydrogen absorbing alloy is defined by $R1_{1-a-b}Mg_aT2_b(Ni_{1-x}M7_x)_z$ and contains an alloy having at least one phase selected from phases having a $Ce_2Ni_7$ type, a $CeNi_3$ type, a $Gd_2Co_7$ type, or a $PuNi_3$ type crystal structure and analogous crystal structures as a main phase.

Herein, R1 is at least one element selected from rare earth elements including yttrium; T2 is at least one element selected from Ca, Ti, and Zr; M7 is at least one element selected from Co, Mn, Fe, V, Cr, Nb, Al, Ga, Zn, Sn, Cu, Si, P, and B; and a, b, x, and z satisfy $0<a \leq 0.6$, $0 \leq b \leq 0.5$, $0 \leq x \leq 0.9$, and $2.5 \leq z \leq 4.5$, respectively. Further, it is described that the "main phase" means that at least one phase selected from phases having the $Ce_2Ni_7$ type, $CeNi_3$ type, $Gd_2Co_7$ type, or $PuNi_3$ type crystal structure and analogous crystal structures occupies the maximum volume in the hydrogen absorbing alloy or the maximum area in a cross section of the hydrogen absorbing alloy.

Further, the following is disclosed, that is, (@) particularly, at least one phase selected from phases having the above-mentioned crystal structures is preferable to exist in 50% or more by the area ratio in the hydrogen absorbing alloy: (ii) if the existence ratio of the phase is less than 50%, it is probable that the hydrogen storage capacity is decreased: (iii) therefore, it is probable that the discharge capacity of a secondary battery having a negative electrode containing the hydrogen absorbing alloy is lowered or the charging and discharging cycle life is shortened: and (iv) the area ratio of the phase is more preferably 60% or higher.

In paragraph numbers 0343 to 0344 of Patent Document 2, it is disclosed that since the fifteenth hydrogen absorbing alloy of Patent Document 2 is defined by a general formula $R1_{1-a-b}Mg_aT2_b(Ni_{1-x}M7_x)_z$ and contains an alloy of at least one phase selected from phases having the $Ce_2Ni_7$ type, $CeNi_3$ type, $Gd_2Co_7$ type, or $PuNi_3$ type crystal structures and analogous crystal structures as a main phase, the hydrogen absorption and release characteristics such as a hydrogen absorption and release speed are remarkably improved. Further, it is also disclosed that since the secondary battery provided with a negative electrode containing this fifteenth hydrogen absorbing alloy is excellent in the hydrogen absorption and release characteristics of the hydrogen absorbing alloy, the secondary battery has a high capacity and an excellent charging and discharging cycle characteristic.

Patent Document 5 discloses that the cycle characteristics are improved by replacing a part of Ni in a rare earth-Mg—Ni-based hydrogen absorbing alloy with Al.

Patent Document 1: Japanese Patent No. 3015885
Patent Document 2: Japanese Patent Application Laid-Open (JP-A) No. 11-323469
Patent Document 3: JP-A No. 2001-316744
Patent Document 4: Japanese Patent No. 3247933
Patent Document 5: JP-A No. 2004-221057

DISCLOSURE OF THE INVENTION

Problems to be Solved by the Invention

However, the above-mentioned "rare earth-Mg—Ni-based alloy" is susceptive to oxidation. Therefore, in the case the hydrogen absorbing alloy is used for a negative electrode of a secondary battery (e.g. a nickel-hydrogen storage battery), the hydrogen absorbing alloy is oxidized in an alkaline electrolyte to be used for the secondary battery. Accordingly, there are problems that the alkaline electrolyte is gradually consumed and decreased: the resistance in the battery is increased: and the cycle life characteristic is decreased. In consideration of these problems, the invention aims to provide a hydrogen absorbing alloy excellent in the cycle life characteristic in the case the hydrogen absorbing alloy is used for a secondary battery.

Means for Solving the Problems

As a result of investigations made by the present inventors to solve the above-mentioned problems, it was found possible to obtain a hydrogen absorbing alloy excellent in the cycle life characteristic in the case the hydrogen absorbing alloy is used for a secondary battery by melting and annealing the alloy in a state that yttrium is added in the process of producing the hydrogen absorbing alloy containing a phase of a $Gd_2Co_7$ type crystal structure. Consequently, the finding is now led to the completion of the present invention.

That is, the present invention provides a hydrogen absorbing alloy containing a phase of a $Gd_2Co_7$ type crystal structure, wherein the phase exists at a ratio of 10 weight % or higher in the entire hydrogen absorbing alloy and yttrium is contained at a ratio of 2 mol % or more and 10 mol % or less in the entire hydrogen absorbing alloy.

Intrinsically, the phase of a $Gd_2Co_7$ type crystal structure is a metastable phase, however, addition of yttrium in the above-mentioned range makes the phase of a $Gd_2Co_7$ type crystal structure stable and considerably increases the production ratio of the phase. It is supposedly attributed to that Y (yttrium) with a smaller atom radius as compared with La, Ce, Pr, and Nd replaces a rare earth site to release the strain and thus lead to stabilization of the structure. If the existence ratio of the phase of a $Gd_2Co_7$ type crystal structure is increased, the corrosion resistance of an obtained hydrogen absorbing alloy to an alkali is heightened and the cycle life characteristic is improved.

In the hydrogen absorbing alloy of the invention, the phase of a $Gd_2Co_7$ type crystal structure exists at a ratio of 10 weight % or more in the alloy. The more preferable range is 10 weight % to 60 weight %. In the case the existence ratio of the phase of a $Gd_2Co_7$ type crystal structure is within this range, an excellent cycle life characteristic can be obtained. Further, a high capacity can be obtained. It is supposedly attributed to that the phase of a $Gd_2Co_7$ type crystal structure causes less lattice expansion than other phases at the time of hydrogen absorption and thus scarcely causes pulverization. A measurement method of the existence ratio (weight %) of the phase of a $Gd_2Co_7$ type crystal structure in the hydrogen absorbing alloy will be described in the section of embodiments.

In the case the content of yttrium is less than 2 mol %, the formation ratio of the phase of a $Gd_2Co_7$ type crystal structure is lowered to result in decrease in the discharge capacity. On the other hand, in the case the content of yttrium exceeds 10 mol %, although the formation ratio of the phase of a $Gd_2Co_7$ type crystal structure becomes high, the lattice volume is decreased and the hydrogen dissociation equilibrium pressure is increased to result in decrease in the charging efficiency and as a result, the discharge capacity is decreased. The content of yttrium is preferably 2 mol % to 7 mol %.

Figure 1:
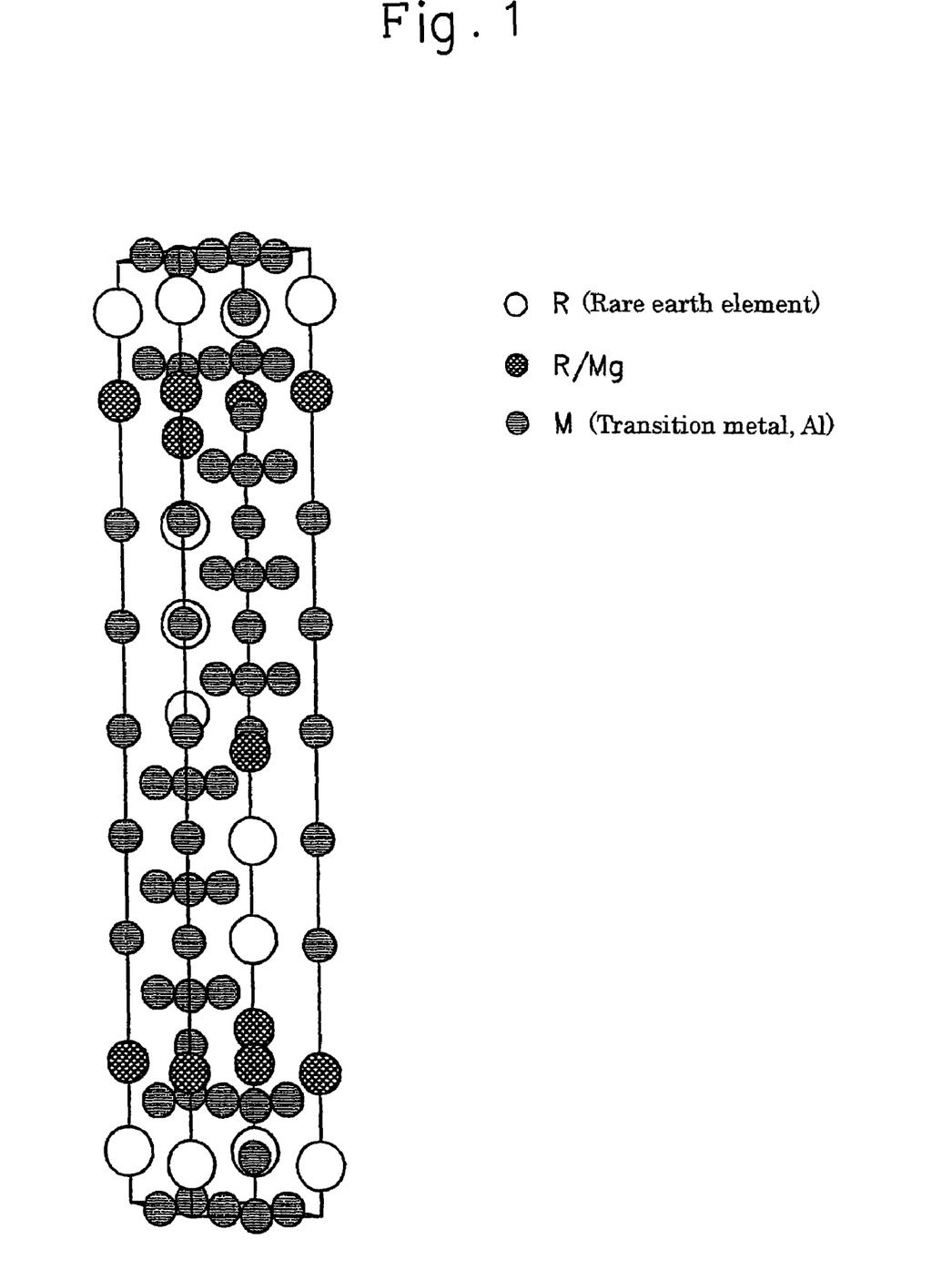
FIG. 1 is a drawing three-dimensionally showing a structure model of a phase of a $Gd_2Co_7$ type crystal structure.

The phase of a $Gd_2Co_7$ type crystal structure is generally a rhombohedral system belonging to the space group of R-3m. The structure model is shown in FIG. 1. With respect to the lattice parameter, the a-axis length is 4.980 to 5.080 Å and the c-axis length is 34.86 to 37.59 Å. The ratio of the c-axis length to the a-axis length in the lattice constant is 7.0 to 7.4 and V (volume) is 748.7 to 840.1 Å$^3$. The phase of a $Gd_2Co_7$ type crystal structure can be analyzed by carrying out x-ray diffraction of a ground hydrogen absorbing alloy powder and analyzing the obtained x-ray diffraction pattern by a Rietveld method. Specifically, it will be described in the section of embodiments.

Further, the invention provides a hydrogen absorbing alloy as described above, wherein the chemical composition of the hydrogen absorbing alloy is defined by a general formula: $R1_uY_vR2_xR3_yR4_z$ in which u, v, x, y, and z satisfy $8 \leq u \leq 19$, $2 \leq v \leq 10$, $2 \leq x \leq 9$, $74 \leq y \leq 79$, $1 \leq z \leq 4$ and $u+v+x+y+z=100$; R1 is one or more element(s) selected from rare earth elements; Y is yttrium; R2 is one or more element(s) selected from a group consisting of Mg, Ca, Sr, and Ba; R3 is one or more element(s) selected from a group consisting of Ni, Co, Cu, Fe, Cr, Si, Zn, Sn, V, Nb, Ta, Ti, Zr, and Hf; and R4 is one or more element(s) selected from a group consisting of Mn and Al. Herein, u, v, x, y, and z denote the ratios (composition ratios) of the numbers of the elements but not ratios on the basis of weight %. In the hydrogen absorbing alloy of the invention, Y (yttrium) is used as an indispensable element.

In the above-mentioned hydrogen absorbing alloy, the corrosion resistance is increased and the cycle life characteristic is made more excellent. Further, the discharge capacity is increased.

Although one or more element(s) selected from a group consisting of La, Ce, Pr, Nd, Sm, Eu, Gd, Tb, Dy, Ho, Er, Tm, Yb, Lu, and Sc are used for R1, in terms of the hydrogen dissociation equilibrium pressure, particularly La, Ce, Pr, and Nd are preferable. Since a Misch metal (Mm), which is a mixture of rare earth elements, is economical, it is preferably used.

Although one or more element(s) selected from a group consisting of Mg, Ca, Sr, and Ba are used for R2, in terms of the hydrogen storage capacity and corrosion resistance, Mg is preferable.

Although one or more element(s) selected from a group consisting of Ni, Co, Cr, Fe, Cu, Zn, Si, Sn, V, Nb, Ta, Ti, Zr, and Hf are used for R3, in terms of the alkali resistance and electrode catalytic activity, particularly Ni and Co are preferable.

It is preferable that one or more element(s) selected from a group consisting of Mn and Al are added as R4. The composition ratios of these elements are in a range of 1 to 4 when the total amount is defined as 100. It is because if the composition ratio is less than 1, the formation ratio of the phase of a $Gd_2Co_7$ type crystal structure may become low and the discharge capacity may be decreased, and in addition, the hydrogen dissociation equilibrium pressure may be increased to decrease the charging efficiency. On the other hand, if the composition ratio exceeds 4, segregation is increased and elution of Mn to an electrolyte occurs to deteriorate the cycle life characteristic.

R4 is particularly preferable to be Mn alone or both of Mn and Al. It is because, in the phase of a $Gd_2Co_7$ type crystal structure of the invention, if Al alone is added, the production ratio of the phase of a $Gd_2Co_7$ type crystal structure is considerably decreased and on the other hand, if Mn alone is added or both Mn and Al are added, the production ratio of the phase of a $Gd_2Co_7$ type crystal structure is increased. In this connection, it is reported that in conventional rare earth-Mg—Ni alloys containing the phase of a $Ce_2Ni_7$ type crystal structure as a main phase, addition of Al as a substituent element for Ni improves the cycle life characteristic.

Specific compositions of the hydrogen absorbing alloy of the invention are, for instance, $La_{13}Y_4Mg_4Ni_{70}CO_4Mn_4$, $La_{15}Y_2Mg_4Ni_{75}Mn_4$, $La_{13}Y_4Mg_4Ni_{75}Mn_4$, $La_{11}Y_7Mg_4Ni_{74}Mn_4$, $La_{13}Y_4Mg_4Ni_{78}Mn_1$, $La_9Y_9Mg_4Ni_{74}Mn_4$, $La_{13}Y_4Mg_4Ni_{75}Mn_2Al_2$, $La_{15}Y_3Mg_4Ni_{73}CO_3Mn_2$, $La_{14}Y_3Mg_5Ni_{72}CO_3Mn_2Al_1$, $La_{14}Y_3Mg_6Ni_{73}CO_2Mn_1Al_1$, $La_{13}Y_3Mg_8Ni_{72}CO_2Mn_2$, $La_{18}Y_3Mg_3Ni_{72}CO_2Mn_1Al_1$, $La_{13}Y_4Mg_4Ni_{70}CO_4Mn_4$, $La_{15}Y_2Mg_4Ni_{75}Mn_4$, $La_{11}Y_7Mg_4Ni_{74}Mn_4$, $La_{13}Y_4Mg_4Ni_{78}Mn_1$, $La_9Y_9Mg_4Ni_{74}Mn_4$, $La_{13}Y_4Mg_4Ni_{75}Mn_2Al_2$, and $La_{13}Y_4Mg_4Ni_{77}Al_2$.

The invention provides a method for producing a hydrogen absorbing alloy involving a first step of producing a melted alloy containing R1, Y, R2, R3 and R4 at a mole ratio of R1:Y:R2:R3:R4 satisfying u:v:x:y:z and a second step of cooling the melted alloy. Herein, $8 \leq u \leq 19$, $2 \leq v \leq 10$, $2 \leq x \leq 9$, $74 \leq y \leq 79$, $1 \leq z \leq 4$, and $u+v+x+y+z=100$ are satisfied and R1 is one or more element(s) selected from rare earth elements; Y is yttrium; R2 is one or more element(s) selected from a group consisting of Mg, Ca, Sr, and Ba; R3 is one or more element(s) selected from a group consisting of Ni, Co, Cu, Fe, Cr, Si, Zn, Sn, V, Nb, Ta, Ti, Zr, and Hf; and R4 is one or more element(s) selected from a group consisting of Mn and Al.

Specifically, as the first step, prescribed amounts of raw material ingots (materials) weighed according to the composition of an intended hydrogen absorbing alloy are put in a crucible. The raw material ingots are heated to 1200° C. to 1600° C. in an inert gas atmosphere or vacuum using a high frequency melting furnace to give a melted alloy. Herein, the melted alloy means a product obtained by weighing the prescribed amounts of the raw material ingots (materials) based on the composition of the intended hydrogen absorbing alloy and heating and melting the materials. Next, as the second step, the melted alloy is cooled.

According to the above-mentioned production method, the hydrogen absorbing alloy of the invention can be obtained.

In the above-mentioned method for producing the hydrogen absorbing alloy, the invention is characterized in that the cooling in the second step is carried out at a speed of 1,000 K/second or higher. Further, the method for producing the hydrogen absorbing alloy of the invention is characterized in that the method further involves a third step of annealing the alloy obtained in the second step and that the annealing is carried out at 860° C. to 1,000° C. Further, the method is characterized in that the annealing is carried out in a pressurized inert gas atmosphere.

If the above-mentioned method for producing the hydrogen absorbing alloy has the characteristics as described above, the formation ratio of the phase of a $Gd_2Co_7$ type crystal structure can be increased.

That is, in the second step, it is preferable to set the cooling speed for cooling the melted alloy at 1,000 K/second or higher. If quenching of the melted alloy is carried at 1,000 K/second or higher as described above, the phase of a $Gd_2Co_7$ type crystal structure, which is a metastable phase, can efficiently be formed. If the cooling speed is less than 1,000 K/second, another phase such as a $CaCu_5$ type crystal structure, which is a stable phase, tends to be produced easily.

From this point of view, the cooling method is preferably a melt spinning method at a cooling speed of 100,000 K/second or higher, a gas atomization method at a cooling speed of about 10,000 K/second, a mold method at a cooling speed of about 1,000 K/second, or a quenching and solidifying method on a water-cooled plate. Particularly, the melt spinning method is more preferably employed since it is made possible to obtain the hydrogen absorbing alloy containing primary grains with a particle size of 10 nm to 100 nm.

Further, as the third step, it is preferable to anneal the alloy obtained in the second step. The alloy after the second step contains a phase mixture of the phase of a $Gd_2Co_7$ type crystal structure, which is a metastable phase, and a stable phase. Performing the heat treatment in the third step remarkably increases the existence ratio of the phase of the $Gd_2Co_7$ type crystal structure.

The annealing in the third step is preferably carried out at 860° C. to 1,000° C. More preferably, it is carried out at 860° C. to 960° C. It is because the existence ratio of the phase of the $Gd_2Co_7$ type crystal structure can be increased.

Further, in the third step, annealing is preferable to be carried out in an inert gas atmosphere in a pressurized state. Conventionally, since annealing is carried out in vacuum (1,000° C. to 1,100° C.) to homogenize the crystal structure, Mg is evaporated to change the crystal structure. In order to prevent this phenomenon, annealing is carried out in an inert gas atmosphere (e.g. argon or helium) in a pressurized state of 0.2 MPa to 1 MPa. Accordingly, evaporation of magnesium is prevented, the materials are hardly oxidized during the heat treatment and the phase of the $Gd_2Co_7$ type crystal structure can be obtained at high efficiency.

The annealing time is preferable to be 3 to 50 hours. It is more preferably 5 to 15 hours. To sufficiently promote the production of the phase of the $Gd_2Co_7$ type crystal structure by the change of the phase, at least three hours is needed to carry out the heat treatment. On the other hand, if the annealing time exceeds 50 hours, re-segregation or the like may probably be caused.

Further, the invention is characterized in that the particle size of the primary grains of the hydrogen absorbing alloy is in a range of 10 nm to 100 nm.

Here, the primary grain particle size in a range of 10 nm to 100 nm means almost all of the primary grains are contained within the range of 10 nm in the minimum to 100 nm in the maximum. Specifically, it means that in the case of measuring the particle size of arbitrary 100 grains in an electron microscope, the ratio of the area occupied by the grains with a particle size of 10 to 100 nm is 80% or higher. Further, the term "primary grains" means grains (also referred to as crystal grains) that have a single crystal structure composed of a single crystallite.

If the hydrogen absorbing alloy is pulverized (the particle size is made extremely small), the crystal structure tends to be broken easily and as a result, the cycle life characteristic is deteriorated. Therefore, if the particle size of the primary grains is set within a range of 10 nm to 100 nm, the volume change at the time of hydrogen absorption and release is efficiently moderated and pulverization is suppressed to lead to improvement in the cycle life characteristic. Further, the phase transformation is easily caused by rearrangement of atoms at the time of heat treatment and formation of the phase of a $Gd_2Co_7$ type crystal structure tends to be caused easily. If the particle size of primary grains is smaller than 10 nm, oxidation is caused easily and if it exceeds 100 nm, pulverization tends to be caused easily and thus the cycle life characteristic is lowered.

The hydrogen absorbing alloy of the invention is used for a hydrogen absorbing alloy electrode as a hydrogen storage medium. Since the hydrogen absorbing alloy of the invention is excellent in the corrosion resistance to a strong alkali, it is preferably used as a negative electrode of a secondary battery. In this case, the cycle life characteristic of the secondary battery is made excellent. Additionally, as a positive electrode of the secondary battery, a nickel electrode (sintered type or non-sintered type) is employed.

In the case of using the hydrogen absorbing alloy of the invention as an electrode, it is preferable for the hydrogen absorbing alloy to be ground. For the grinding, for instance, mechanical grinding or hydrogenation grinding can be employed. Grinding may be carried out before or after annealing, however, since the surface area of the hydrogen absorbing alloy is increased and the alloy tends to be oxidized easily if the alloy is ground, it is more preferable to carry out grinding after annealing. In this connection, to prevent oxidation of the surface of the hydrogen absorbing alloy, it is preferable to carry out grinding in an inert gas atmosphere.

This application is based on the Japanese Patent Application (2005-246107) filed on Aug. 26, 2005 with the Japan Patent Office and the content is hereby incorporated for reference.

Effects of the Invention

As described above, according to the present invention, it is made possible to obtain a hydrogen absorbing alloy excellent in the cycle life characteristic in the case the alloy is used for a secondary battery.

BEST MODE FOR CARRYING OUT THE INVENTION

Hereinafter, the present invention will be described in more detail with reference to Examples and Comparative Examples, however, it is not intended that the invention be limited to the following Examples.

(1) First, methods for measuring various kinds of characteristics of hydrogen absorbing alloys and methods for producing positive electrodes and negative electrodes will be described.

(1.1) Measurement of Average Particle Size

The average particle size and particle size distribution of hydrogen absorbing alloys were measured by a laser diffraction/scattering method using a particle size analyzer (product name: Micro Track MT3000, manufactured by Micro Track Co., Ltd.).

The average particle size means a progressive average diameter D50, that is, the particle size at 50% point of the cumulative curve formed by setting the entire volume of the powder to be 100%.

(1.2) Measurement of Particle Size of Primary Grains

The particle size of primary grains was measured using a transmission electron microscope (H9000, manufactured by Hitachi, Ltd.). The particle size of primary grains was obtained by measuring the longest length of the long side and the shortest length of the short side of each crystal grain for arbitrary 100 pieces by the transmission electron microscope and carrying out calculation according to the following equation.

Particle size=(long side+short side)/2

(1.3) Analysis of Crystal Structure and Measurement of Existence Ratio

The crystal structures of hydrogen absorbing alloys were analyzed and confirmed by x-ray diffraction.

The x-ray diffraction was carried out using AXS manufactured by Bruker (model name: M06XCE). With respect to measurement conditions, the accelerating voltage was 40 kV, the electric current was 100 mA, the x-ray tube was a Cu—Kα beam type tube, the scanning speed was 2 deg/min, and the step angle was 0.02 deg. Samples at the time of measuring XRD were prepared by grinding each of the obtained hydrogen absorbing alloy to a powder with an average particle size $D_{50}$ of 20 to 25 μm.

The crystal system and the space group were identified by crystal structure analysis and lattice parameters and the existence ratio (weight %) of the obtained phases were measured by a Rietveld method (RIETAN 2000).

(1.4) Identification of Phase of $Gd_2Co_7$ Type Crystal Structure

The phase of a $Gd_2Co_7$ type crystal structure was identified by x-ray diffraction (the measurement conditions were the same as the above) for the powder obtained by grinding each hydrogen absorbing alloy and a Rietveld method for the x-ray diffraction pattern. The phase of a $Gd_2Co_7$ type crystal structure has a structure model shown in FIG. 1 and atomic arrangements shown in Table 1.

TABLE 1

| Atom | Site | Occupation ratio | x | y | z |
|---|---|---|---|---|---|
| A/1 | 6c | 1.0 | 0 | 0 | 0.0520 |
| A2/B1 | 6c | 0.5/0.5 | 0 | 0 | 0.1460 |
| C1 | 3b | 1.0 | 0 | 0 | 0.5 |
| C2 | 6c | 1.0 | 0 | 0 | 0.2783 |
| C3 | 6c | 1.0 | 0 | 0 | 0.3883 |
| C6 | 9e | 1.0 | 0.5 | 0 | 0 |
| C7 | 18h | 1.0 | 0.5 | 0.5 | 0.1117 |

A = rare earth element
B = Mg, Ca, Sr, Ba
C = transition element such as Ni, Co, Mn, Cr, Fe, Cu, Zn, Si, or Sn and Al in combination.

Figure 2:
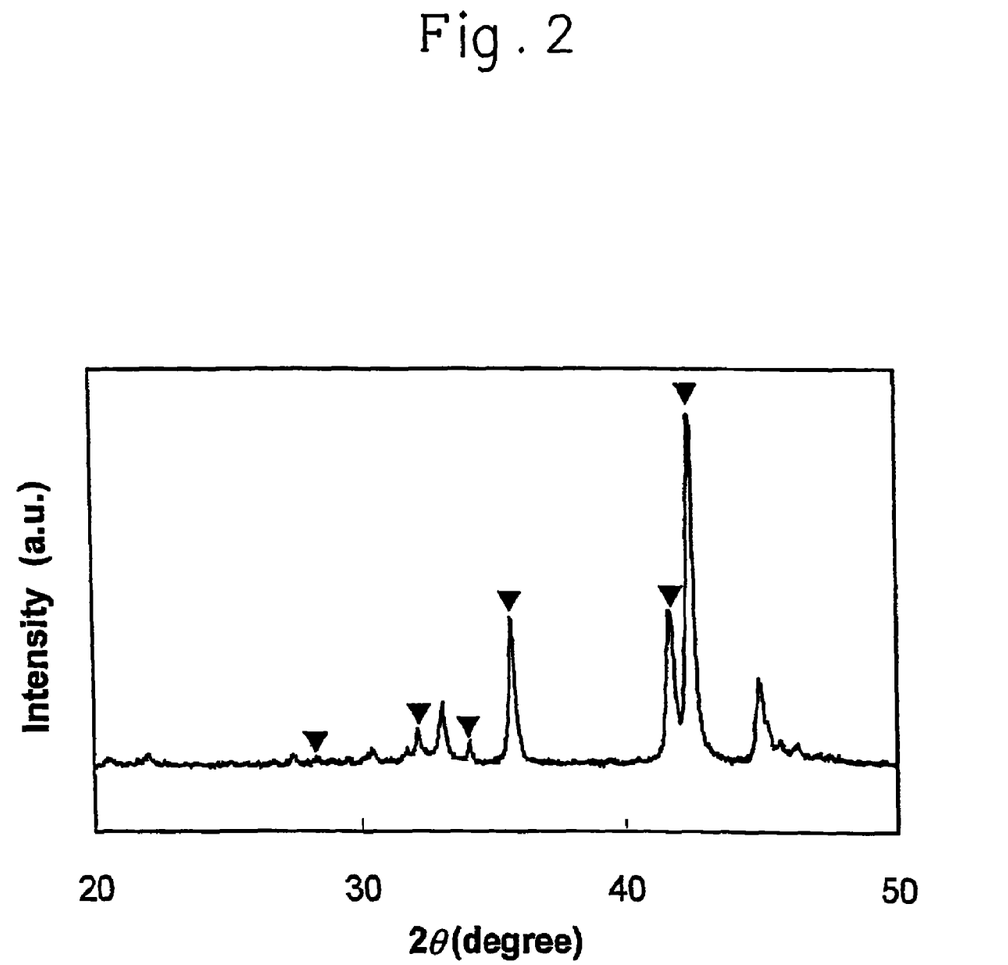
FIG. 2 is a drawing showing one example of an x-ray diffraction pattern of a hydrogen absorbing alloy.

Measurement results of, as one example, the hydrogen absorbing alloy (composition: $La_{13}Y_4Mg_4Ni_{78}Mn_1$) of the present invention are shown. X-ray diffraction was carried out to obtain an x-ray diffraction pattern as shown in FIG. 2. The peak shown with an arrow in FIG. 2 is attributed to a $Gd_2Co_7$ type crystal structure. With respect to the phase of a $Gd_2Co_7$ type crystal structure, the plane indexes and diffraction angle shown in Table 2 were obtained.

TABLE 2

| Plane indexes | | | Peak position |
|---|---|---|---|
| h | k | l | (°) |
| 0 | 1 | 8 | 28.4 ± 0.1 |
| 1 | 0 | 10 | 32.1 ± 0.1 |
| 0 | 1 | 11 | 34.1 ± 0.1 |
| 1 | 1 | 0 | 35.8 ± 0.1 |
| 0 | 2 | 1 | 41.6 ± 0.1 |
| 1 | 1 | 9 | 42.4 ± 0.1 |
| 0 | 3 | 9 | 68.8 ± 0.1 |
| 2 | 2 | 0 | 75.8 ± 0.1 |

(1.5) Production of Positive Electrode and Negative Electrode

Negative electrode production was carried out by the following method. After 100 g of a powder of each hydrogen absorbing alloy and 3 weight % of a nickel powder (INCO #210) were mixed, an aqueous solution containing a thickener (methyl cellulose) dissolved therein and also 1.5 weight % of a binder (styrene-butadiene rubber) was added to produce a paste. The paste was applied to both faces of a perforated steel plate (thickness: 45 μm, porosity: 60%) and dried and the resulting steel plate was pressed to a prescribed thickness (0.36 mm) to obtain a negative electrode.

As a positive electrode, a sintered type nickel hydroxide electrode with an excess capacity was employed.

(1.6) Production of Opened Type Cell

The negative electrode was sandwiched between the positive electrodes with a separator interposed therebetween and fixed by acrylic plates in a manner that a pressure of 10 kgf/cm$^2$ could be applied to these negative electrode and positive electrode to assemble an opened type cell. As an electrolyte, a mixed solution containing 6.8 mol/L of a KOH solution and 0.8 mol/L of an LiOH solution was employed.

(1.7) Measurement of Discharge Capacity

The discharge capacity was measured at 0.2 ItA (mAh/g) when the capacity became the maximum after 10 cycles of charging and discharging were carried out in a water bath at 20° C. under the following conditions: charging to 150% of capacity at 0.1 ItA and discharging at 0.2 ItA to the final voltage of −0.6 V (vs. Hg/HgO).

(1.8) Measurement of Capacity Retention Ratio

A charging and discharging cycle test was carried out in a water bath at 20° C. The capacity retention ratio was calculated from the discharge capacities at the 10th cycle and the 50th cycle according to the following equation.

Capacity retention ratio (%)=(discharge capacity at 50th cycle)/(discharge capacity at 10th cycle)× 100

In this connection, the charging conditions and discharging conditions at the time of the charging and discharging cycles were as follows.

(1st Cycle to 10th Cycle)
Charging: to 150% of capacity at 0.1 ItA
Discharging: to the final voltage of −0.6 V (vs. Hg/HgO) at 0.2 ItA
(11th Cycle)
Charging: to 150% at 0.1 ItA
Discharging: to the final voltage of −0.6 V (vs. Hg/HgO) at 1 ItA (12th Cycle)
  Charging: to 150% at 0.1 ItA
  Discharging: to the final voltage of −0.6 V (vs. Hg/HgO) at 3 ItA
(13th Cycle to 49th Cycle)
  Charging: to 75% at 1 ItA
  Discharging: to the final voltage of −0.6 V (vs Hg/HgO) at 0.5 ItA (50th cycle)
  Charging: to 150% at 0.1 ItA
  Discharging: to the final voltage of −0.6 V (vs Hg/HgO) at 0.2 ItA (2) Hereinafter, Examples and Comparative Examples will be described.

Example 1

Based on an intended composition defined by a composition formula $La_{13}Y_4Mg_4Ni_{70}Co_4Mn_4$, prescribed amounts of raw material ingots were weighed and put in a crucible and heated to 1500° C. using a high frequency melting furnace in a helium gas atmosphere at reduced pressure to melt the materials. After the melting, the melted alloy was cooled in a mold in the furnace by a mold method to obtain a hydrogen absorbing alloy. Next, the obtained hydrogen absorbing alloy was ground mechanically in an argon gas atmosphere to adjust the average particle size to $D_{50}=60$ μm. Here, no heat treatment (recrystallization annealing) was carried out.

The composition of the obtained hydrogen absorbing alloy was confirmed by ICP analysis. The crystal structure of the hydrogen absorbing alloy and the existence ratio (%) were measured. The discharge capacity at 0.2 ItA and capacity retention ratio of the hydrogen absorbing alloy were measured.

The results of the above-mentioned measurements are shown in Table 3. In Table 3, the results of Examples 2 to 19 as well as the results of Comparative Examples 1 to 11 to be described later are also shown.

Examples 2 to 7

The same operation as that in Example 1 was carried out except that raw material ingots were weighed in Examples 2 to 7 in accordance with composition formulas different from that in Example 1. The composition formulas respectively different from that in Example 1 are shown in the column of "Composition formula" in Table 3.

Example 8

Based on an intended composition defined by a composition formula $La_{15}Y_3Mg_4Ni_{73}Co_3Mn_2$, prescribed amounts of raw material ingots were weighed and put in a crucible and heated to 1500° C. using a high frequency melting furnace in a helium gas atmosphere at reduced pressure to melt the materials. After the melting, the melted alloy was quenched and solidified by a melt spinning method to obtain a hydrogen absorbing alloy. Next, the obtained hydrogen absorbing alloy was heat-treated in a helium gas atmosphere pressurized to 0.2 MPa (gauge pressure) using an electric furnace. The heat treatment conditions (annealing conditions) were a furnace inside temperature (that is, alloy temperature) of 940° C. for 7 hours to carry out recrystallization annealing. Accordingly, a hydrogen absorbing alloy with the intended composition was obtained. Finally, the hydrogen absorbing alloy was ground mechanically in an argon gas atmosphere to adjust the average particle size to $D_{50}=60$ μm.

The composition of the obtained hydrogen absorbing alloy was confirmed by ICP analysis. The crystal structure of the obtained hydrogen absorbing alloy and the existence ratio (%) were measured. The discharge capacity at 0.2 ItA and capacity retention ratio of the obtained hydrogen absorbing alloy were measured. The results are shown in Table 3.

Examples 9 to 19

The same operation as that in Example 8 was carried out except that raw material ingots were weighed in Examples 9 to 19 in accordance with composition formulas different from that in Example 8. The composition formulas respectively different from that in Example 8 are shown in the column of "Composition formula" in Table 3.

Herein, it was confirmed that the hydrogen absorbing alloys obtained in Examples 8 to 19 contained primary grains with a particle size of 10 nm to 100 nm.

Comparative Examples 1 and 2

The same operation as that in Example 1 was carried out except that raw material ingots were weighed in Comparative Examples 1 and 2 in accordance with composition formulas different from that in Example 1. The composition formulas respectively different from that in Example 1 are shown in the column of "Composition formula" in Table 3.

Comparative Examples 3 to 11

The same operation as that in Example 8 was carried out except that raw material ingots were weighed in Comparative Examples 3 to 11 in accordance with composition formulas different from that in Example 8. The composition formulas respectively different from that in Example 8 are shown in the column of "Composition formula" in Table 3.

TABLE 3

| | Composition formula | Heat treatment condition | Crystal structure existence ratio: weight (%) | | | | | | Discharge capacity at 0.2 ItA (mAh/g) | Capacity retention ratio 50th/10th (%) |
|---|---|---|---|---|---|---|---|---|---|---|
| | | | Gd2Co7 | CaCu5 | Ce2Ni7 | Pr5Co19 | Ce5Co19 | AuBe5 | | |
| Example 1 | La13Y4Mg4Ni70Co4Mn4 | as-cast | 23 | 23 | 27 | 6 | 18 | 3 | 345 | 93 |
| Example 2 | La15Y2Mg4Ni75Mn4 | as-cast | 10 | 36 | 27 | 6 | 19 | 2 | 335 | 92 |
| Example 3 | La13Y4Mg4Ni75Mn4 | as-cast | 16 | 29 | 29 | 6 | 18 | 2 | 340 | 93 |
| Example 4 | La11Y7Mg4Ni74Mn4 | as-cast | 19 | 25 | 30 | 5 | 19 | 2 | 335 | 92 |
| Example 5 | La13Y4Mg4Ni78Mn1 | as-cast | 14 | 31 | 26 | 5 | 20 | 4 | 333 | 92 |
| Example 6 | La9Y9Mg4Ni74Mn4 | as-cast | 22 | 20 | 32 | 6 | 18 | 2 | 330 | 92 |
| Example 7 | La13Y4Mg4Ni75Mn2Al2 | as-cast | 14 | 32 | 25 | 4 | 21 | 4 | 337 | 92 |
| Example 8 | La15Y3Mg4Ni73Co3Mn2 | 940 | 45 | 14 | 22 | 0 | 17 | 2 | 352 | 94 |
| Example 9 | La14Y3Mg5Ni72Co3Mn2Al1 | 940 | 48 | 13 | 26 | 0 | 11 | 2 | 354 | 95 |

TABLE 3-continued

| | Composition formula | Heat treatment condition | Crystal structure existence ratio: weight (%) | | | | | | Discharge capacity at 0.2 ItA (mAh/g) | Capacity retention ratio 50th/10th (%) |
| --- | --- | --- | --- | --- | --- | --- | --- | --- | --- | --- |
| | | | Gd2Co7 | CaCu5 | Ce2Ni7 | Pr5Co19 | Ce5Co19 | AuBe5 | | |
| Example 10 | La14Y3Mg6Ni73Co2Mn1Al1 | 940 | 51 | 11 | 26 | 0 | 10 | 2 | 351 | 92 |
| Example 11 | La13Y3Mg8Ni72Co2Mn2 | 940 | 52 | 10 | 24 | 0 | 10 | 4 | 352 | 92 |
| Example 12 | La18Y3Mg3Ni72Co2Mn1Al1 | 940 | 31 | 6 | 46 | 0 | 7 | 10 | 341 | 92 |
| Example 13 | La13Y4Mg4Ni70Co4Mn4 | 940 | 47 | 8 | 20 | 5 | 20 | 0 | 360 | 96 |
| Example 14 | La15Y2Mg4Ni75Mn4 | 940 | 21 | 12 | 35 | 7 | 24 | 0 | 357 | 95 |
| Example 15 | La11Y7Mg4Ni74Mn4 | 940 | 52 | 10 | 21 | 5 | 12 | 0 | 352 | 95 |
| Example 16 | La13Y4Mg4Ni78Mn1 | 940 | 20 | 14 | 38 | 5 | 23 | 0 | 355 | 94 |
| Example 17 | La9Y9Mg4Ni74Mn4 | 940 | 58 | 12 | 15 | 5 | 10 | 0 | 332 | 92 |
| Example 18 | La13Y4Mg4Ni75Mn2Al2 | 940 | 42 | 10 | 15 | 7 | 23 | 3 | 359 | 93 |
| Example 19 | La13Y4Mg4Ni77Al2 | 940 | 11 | 14 | 5 | 8 | 55 | 7 | 342 | 92 |
| Comparative Example 1 | La17Mg4Ni75Mn4 | as-cast | 4 | 48 | 25 | 5 | 16 | 2 | 325 | 89 |
| Comparative Example 2 | La2Y15Mg4Ni75Mn4 | as-cast | 27 | 27 | 24 | 4 | 15 | 4 | 291 | 87 |
| Comparative Example 3 | La15.5Y1.5Mg4Ni75Mn2Al2 | 940 | 2 | 21 | 49 | 5 | 21 | 2 | 335 | 89 |
| Comparative Example 4 | La14Y5Mg4Ni72Co1Mn2Al2 | 940 | 3 | 10 | 50 | 2 | 23 | 12 | 341 | 88 |
| Comparative Example 5 | La10Y4Mg4Ni75Co5Mn1Al1 | 940 | 0 | 58 | 21 | 0 | 21 | 0 | 285 | 90 |
| Comparative Example 6 | La13Y4Mg4Ni75Co4 | 940 | 3 | 21 | 42 | 4 | 26 | 4 | 335 | 89 |
| Comparative Example 7 | La13Y4Mg4Ni72Co2Mn1Al4 | 940 | 4 | 35 | 25 | 3 | 16 | 17 | 324 | 87 |
| Comparative Example 8 | La15Y3Mg1Ni77Co2Mn1Al1 | 940 | 0 | 89 | 5 | 0 | 6 | 0 | 221 | 93 |
| Comparative Example 9 | La10Y3Mg10Ni71Co4Mn2 | 940 | 9 | 0 | 58 | 0 | 0 | 33 | 231 | 81 |
| Comparative Example 10 | La17Mg4Ni75Mn4 | 940 | 8 | 16 | 40 | 7 | 29 | 0 | 338 | 90 |
| Comparative Example 11 | La2Y15Mg4Ni75Mn4 | 940 | 63 | 11 | 13 | 5 | 8 | 0 | 298 | 87 |

Example 20

Based on an intended composition defined by a composition formula $La_{13}Y_4Mg_4Ni_{75}Mn_1$, prescribed amounts of raw material ingots were weighed and put in a crucible and heated to 1,500° C. using a high frequency melting furnace in a helium gas atmosphere at reduced pressure to melt the materials. After the melting, the melted alloy was quenched and solidified by a melt spinning method to obtain a hydrogen absorbing alloy. The obtained hydrogen absorbing alloy was heat-treated in a helium gas atmosphere pressurized to 0.2 MPa (gauge pressure) using an electric furnace. The heat treatment conditions (annealing conditions) were a furnace inside temperature (that is, alloy temperature) of 860° C. for 7 hours to carry out recrystallization annealing. Accordingly, a hydrogen absorbing alloy with the intended composition was obtained. The hydrogen absorbing alloy was ground mechanically in an argon gas atmosphere to adjust the average particle size to $D_{50}=60$ μm.

The composition of the obtained hydrogen absorbing alloy was confirmed by ICP analysis. The crystal structure of the obtained hydrogen absorbing alloy and the existence ratio (%) were measured. The discharge capacity at 0.2 ItA and capacity retention ratio of the obtained hydrogen absorbing alloy were measured.

The results of the measurements are shown in Table 4. In Table 4, the results of Examples 21 to 25 as well as the results of Comparative Examples 12 and 13 to be described later are also shown.

Examples 21 to 25

The same operation as that in Example 20 was carried out except that the heat treatment conditions (annealing conditions) in Examples 21 to 25 were made different from those in Example 20. The heat treatment conditions (annealing conditions) respectively different from that in Example 20 are shown in the column of "Heat treatment condition (° C.)" in Table 4. Herein, the annealing time was 7 hours for all.

Comparative Example 12

The same operation as that in Example 20 was carried out except that the heat treatment conditions (annealing conditions) were a temperature of 800° C. for 7 hours to carry out recrystallization annealing.

Comparative Example 13

The same operation as that in Example 20 was carried out except that the heat treatment conditions (annealing conditions) were a temperature of 1,030° C. for 7 hours to carry out recrystallization annealing.

TABLE 4

|  | Composition formula | Heat treatment condition (°C.) | Crystal structure existence ratio: weight (%) | | | | | | Discharge capacity at 0.2 ItA (mAh/g) | Capacity retention ratio 50th/10th (%) |
| --- | --- | --- | --- | --- | --- | --- | --- | --- | --- | --- |
|  |  |  | Gd2Co7 | CaCu5 | Ce2Ni7 | Pr5Co19 | Ce5Co19 | AuBe5 |  |  |
| Example 20 | La13Y4Mg4Ni75Mn4 | 860 | 22 | 20 | 28 | 7 | 23 | 0 | 350 | 95 |
| Example 21 | Same as above | 910 | 22 | 21 | 29 | 6 | 22 | 0 | 355 | 95 |
| Example 22 | Same as above | 930 | 34 | 16 | 22 | 8 | 20 | 0 | 360 | 95 |
| Example 23 | Same as above | 940 | 44 | 12 | 19 | 7 | 18 | 0 | 365 | 95 |
| Example 24 | Same as above | 960 | 35 | 26 | 16 | 7 | 16 | 0 | 361 | 95 |
| Example 25 | Same as above | 1000 | 18 | 40 | 20 | 5 | 17 | 0 | 330 | 95 |
| Comparative Example 12 | Same as above | 800 | 8 | 20 | 49 | 0 | 9 | 14 | 325 | 91 |
| Comparative Example 13 | Same as above | 1030 | 3 | 69 | 16 | 0 | 12 | 0 | 324 | 92 |

As shown in Table 3, the discharge capacities of the hydrogen absorbing alloys of Examples 1 to 19 were large as compared with those of the hydrogen absorbing alloys of Comparative Examples 1 to 11. The cycle life characteristics of the hydrogen absorbing alloys of Examples 1 to 19 were excellent as compared with those of the hydrogen absorbing alloys of Comparative Examples 1 to 11.

As shown in Table 4, it was confirmed that the hydrogen absorbing alloys of Examples 20 to 25 subjected to the heat treatment at a temperature in a range from 860 to 1000° C. in an inert gas atmosphere in a pressurized state after melting and solidification had increased formation ratios of the phase of a $Gd_2Co_7$ type crystal structure, which is a metastable phase, as compared with that of Example 3 without the heat treatment in Table 3 and accordingly, the cycle characteristics were improved as well.

The invention claimed is:

1. A hydrogen absorbing alloy containing a phase of a $Gd_2Co_7$ type crystal structure, wherein said phase exists at a ratio of 10 weight % or higher in said entire hydrogen absorbing alloy and yttrium is contained at a ratio that ranges from 2 mol % to 10 mol % in said entire hydrogen absorbing alloy.

2. The hydrogen absorbing alloy according to claim 1, wherein the chemical composition of said hydrogen absorbing alloy is defined by a general formula $R1_uY_vR2_xR3_yR4_z$, wherein u, v, x, y, and z satisfy $8 \leq u \leq 19$, $2 \leq v \leq 10$, $2 \leq x \leq 9$, $74 \leq y \leq 79$, $1 \leq z \leq 4$, and $u+v+x+y+z=100$;

R1 is one or more element(s) selected from rare earth elements; Y is yttrium;

R2 is one or more element(s) selected from the group consisting of Mg, Ca, Sr, and Ba;

R3 is one or more element(s) selected from the group consisting of Ni, Co, Cu, Fe, Cr, Si, Zn, Sn, V, Nb, Ta, Ti, Zr, and Hf; and $R_4$ is one or more element(s) selected from the group consisting of Mn and Al.

3. The hydrogen absorbing alloy according to claim 1, wherein said hydrogen absorbing alloy is produced by cooling a melted ally at a cooling speed of 1,000 K/second or higher and annealing the cooled alloy at 860° C. to 1,000° C. in a pressurized inert gas atmosphere.

4. The hydrogen absorbing alloy according to claim 1, wherein the particle size of primary grains of said hydrogen absorbing alloy is 10 nm to 100 nm.

5. The hydrogen absorbing alloy according to claim 3, wherein the particle size of primary grains of said hydrogen absorbing alloy is 10 nm to 100 nm.

6. A secondary battery using the hydrogen absorbing alloy according to claim 1 for a negative electrode.

7. A secondary battery using the hydrogen absorbing alloy according to claim 3 for a negative electrode.

8. A secondary battery using the hydrogen absorbing alloy according to claim 4 for a negative electrode.

* * * * *